Figure 1:
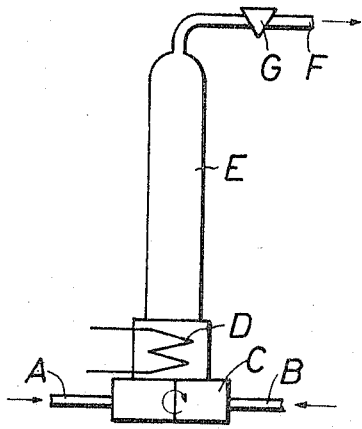

May 30, 1967  E. LEHMANN ETAL  3,322,820
PROCESS FOR THE CONTINUOUS PRODUCTION OF ANTHRANILIC ACID
Filed Dec. 2, 1963

ERICH LEHMANN, WALTER RAPP, RUDOLF FINGADO, INVENTORS
HERBERT NORDT.
BY

ATTORNEY 3,322,820
PROCESS FOR THE CONTINUOUS PRODUCTION OF ANTHRANILIC ACID
Erich Lehmann, Burscheid, and Walter Rapp, Rudolf Fingado and Herbert Nordt, Leverkusen, Germany, assignors to Farbenfabriken Bayer Aktiengesellschaft, Leverkusen, Germany, a corporation of Germany
Filed Dec. 2, 1963, Ser. No. 327,382
Claims priority, application Germany, Dec. 1, 1962, F 38,439
3 Claims. (Cl. 260—518)

The present invention relates, in general, to a new and improved process and apparatus for the production of anthranilic acid. More particularly, the invention provides a unique continuous process and attendant apparatus for producing anthranilic acid from phthalamic acid alkali metal salt by oxidation with alkali metal hypochlorite, which is readily controllable and leads to extremely pure anthranilic acid under conditions of high space-time yields.

Currently, the commercial synthesis of anthranilic acid is effected pursuant to the process of German patent specification No. 55,988 from phthalimide acid (phthalic acid monoamide) by oxidation with sodium hypochlorite via a chlorinated acid amide which is hydrolyzed to the amine and carbonic acid (carbon dioxide) by the Hofmann reaction within an alkaline medium. BIOS Final Report 986 I, pages 53–55, discloses in substantial detail the process proceeding from phthalic acid anhydride as the starting material. Thus, the phthalic acid anhydride is reacted with aqueous ammonia to yield phthalamic acid, which is then subjected to the same reaction mechanism or conditions as described in the aforementioned German patent specification No. 55,988.

The commercial application of this synthesis requires a reaction vessel of substantial volume to effect the Hofmann reaction since, according to the published technique, it is carried out by adding one extremely cooled component to the other extremely cooled component. Inasmuch as the process proceeds in an exothermic manner, i.e., temperatures of 75° C. being achieved towards the end of the reaction, foaming due to the carbon dioxide arising from the reaction solution, and which should be reacted to yield sodium carbonate with the caustic soda present in the reaction solution, cannot always be avoided such that utilization of available space in the reaction vessel is somewhat limited. Additionally, since the total amounts of the reaction components or reactants are rapidly brought together within one reaction vessel, it is no longer possible to regulate the course of the reaction, per se. Possible errors in filling or in the reaction therefore lead, unavoidably, to reductions in yield and quality. A further disadvantage of the present commercial synthesis as thus described resides in the fact that the reaction vessel itself is heated by the heat of reaction, bearing in mind that this vessel must be cooled prior to the succeeding filling or charging to a temperature of $-12°$ C.

The present invention is based, at least in part, on the discovery that the process for the production of anthranilic acid according to the above-described principles can be effected with significantly improved results, higher space-time yields, and with the achievement of exceptional quality for the end-product, provided the reaction components are continuously brought together in pre-determined measured amounts. In accordance with this method of operation, the process is readily controlled with respect to quantity and temperature, and high-throughput can be achieved with the smallest possible volume.

In the practice of the process of the invention, the resulting solutions of anthranilic alkali metal salt can be worked-up in accordance with customary procedures, or they can be introduced directly as such, by reason of their excellent quality, to further reactions or syntheses well known in the art.

The continuous process of the present invention is effected in such manner that previously cooled aqueous solutions of alkali metal phthalamic acid salt and alkali metal hypochlorite are supplied separately in pre-determined amounts through a measuring chamber into a reaction column in the initial portion of which there is provided a suitable cooling system. For carrying out the continuous synthesis of the invention, it is essential that the reaction proceeds in two stages. Thus, the first stage of the reaction commences in a mixing chamber and is completed in the aforementioned initial cooled part of the column. In this way, presumably via the intermediate phase of the N-chlorinated phthalic acid monoamide, the corresponding isocyanate is produced, which is then hydrolyzed in the second stage of the reaction, conducted in a second portion of the reaction column, by excess alkali metal hydroxide, to the alkali metal anthranilic acid salt and carbon dioxide. At the end of the reaction column, the solution of alkali metal anthranilic acid salt, heated by the reaction mechanism, is neutralized by running in a suitable neutralizing agent such, for example, as sulphuric acid, expediently regulated by means of a pH-meter, and it can then be either worked-up to anthranilic acid itself by the further addition of acid, or it can be introduced directly for use in further syntheses.

It is believed that the continuous synthesis of the invention may best be understood by reference to the specific apparatus illustrated in the schematic flow diagrams, wherein the lettered symbols denote the following respective components of the apparatus:

With reference to FIG. 1 the symbols represent:

$A$=inlet for the phthalamic acid alkali metal salt solution;
$B$=inlet for the alkali metal hypochlorite solution;
$C$=measuring chamber;
$D$=cooling system;
$E$=reaction chamber;
$F$=outlet for reaction solution; and
$G$=inlet for neutralizing agent.

Figure 2:
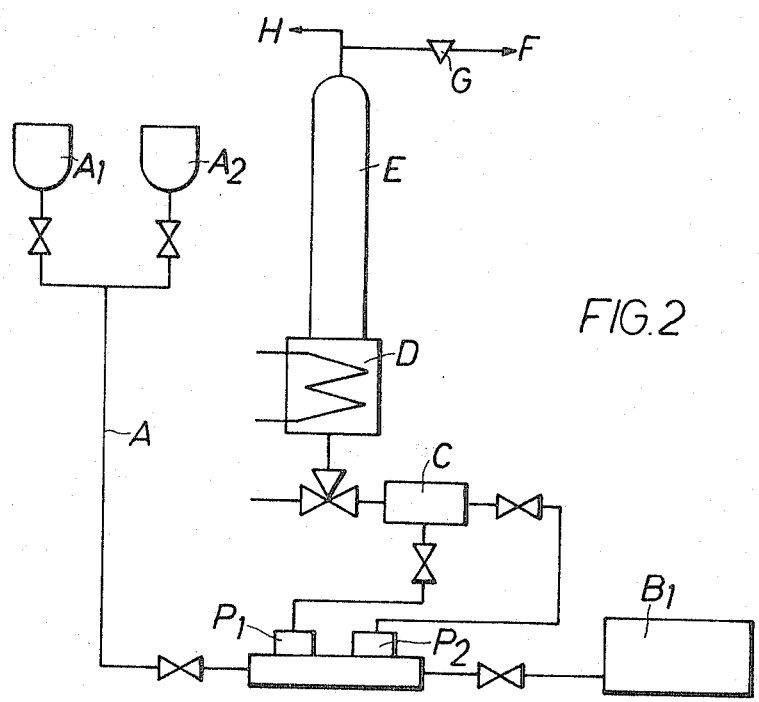

With reference to FIG. 2 the symbols represent:

$A_1$ and $A_2$=reaction vessels for the production of phthalamic acid alkali metal salt;
$P_1$ and $P_2$=metering pumps;
$B_1$=vessel for alkali metal hypochlorite solution;
$H$=gas outlet; and
$A, C, D, E, F$ and $G$ represent the same components as $A, C, D, E, F$ and $G$ represent the same components as previously described above in connection with FIG. 1.

With reference to the drawings, a cooled solution of alkali metal phthalic acid salt is introduced through the inlet A into the mixing chamber C (at about $-8$ to $-10°$ C.), the same being obtained from vessels $A_1$ and $A_2$ as illustrated in FIG. 2. By providing two vessels for the production of the phthalamic acid alkali salt, they can be used alternatively, which is especially advantageous from the standpoint of the continuity of the process of the invention. From vessel $B_1$, an extremely cooled alkali metal hypochlorite solution, preferably sodium hypochlorite solution which, in its content of alkali metal hypochlorite and alkali metal hydroxide, complies with a definite pre-determined mixing ratio for phthalamic acid alkali metal salt, is similarly introduced into the mixing device C. For one part by volume of phthalamic acid alkali metal salt, a two-fold, three-fold or many-fold volume of alkali metal hypochlorite solution can be employed, with the proviso that the amount of alkali metal hypochlorite and caustic soda necessary for the reaction is consistent with the amount of phthalamic acid sodium salt employed.

Preferably, the solutions of the starting reactants are introduced into the mixing chamber through suitable metering pumps. In the mixing chamber, the first phase of the reaction begins, i.e., the postulated formation of N-chlorinated phthalamic acid, which is concluded or brought to completion in the initial cooled portion of the column E at a temperature of up to at most 10° C. The termination of the first reaction stage, which is of decisive importance from the standpoint of the purity and yield of the desired end-product, is cooled by appropriate adjustment of the reaction time and throughput.

In the following portion of the reaction column, the second phase of the reaction proceeds, i.e., the Hofmann synthesis within an alkaline medium to yield anthranilic acid alkali metal salt and carbon dioxide. The exothermic reaction should not heat the liquid at the head of the column above a temperature between about 60–70° C.

The alkali metal carbonate-containing solution of anthranilic acid alkali metal salt runs through the outlet pipe F as a clear, pale yellow solution, and can be introduced to any further desired use following neutralization. By employing sulphuric acid as the neutralizing agent, which can be added at any desired point in the outlet and measured by means of the pH-meter, a solution is obtained which, besides alkali metal salts, consists essentially of anthranilic acid alkali metal salt.

As may be readily understood by reference to the foregoing description, the continuous reaction mechanism of the invention is easily supervised and regulated, and leads to extremely pure anthranilic acid and high space-time yields.

It is believed that the foregoing principles and procedures will be best understood by reference to the following specific example illustrating a typical continuous production of anthranilic acid within an apparatus corresponding to that illustrated in the schematic flow diagram of FIG. 2.

EXAMPLE

An extremely cooled neutral solution of phthalamic acid sodium salt was allowed to flow in alternate time sequence from vessels $A_1$ and $A_2$ through the input pipe A to the pump $P_1$. At the same time, an extremely cooled alkali metal hypochlorite solution was permitted to flow from vessel $B_1$ towards pump $P_2$. The pumps $P_1$ and $P_2$ deliver both solutions in a pre-determined proportion to the mixing chamber C which, for example, may consist of a so-called Schoppe chamber, such as that described in published German patent application DAS 1,035,306.

The mixture of the two reaction components enters into a portion of the reaction space D which is cooled with brine, and leaves this portion after the conclusion of the first reaction phase. After entering the uncooled portion of reaction space E, the second strongly exothermic phase of the reaction proceeds with the formation of anthranilic acid sodium salt. This anthranilic acid sodium salt is withdrawn through outlet pipe F following the introduction of sulphuric acid which is regulated according to the pH value. The neutralized product may then be employed directly for further syntheses, or it may be further treated to yield crystalline anthranilic acid according to known techniques.

In a typical apparatus in which the cooling system D has a capacity of 30 liters and the exothermic reaction space E has a capacity of 90 liters, 750 liters of a reaction mixture, having the following composition, can be fed through in approximately one hour:

A phthalamic acid sodium salt solution with a content of 615 grams per liter and sodium hypochlorite solution with a content of 92.5 grams active chlorine and 106 grams caustic soda per liter were supplied to the reaction space D in a ratio of 1:2.5 through pumps $P_1$ and $P_2$. The residence time in part D of the reaction space amounted, therefore, to approximately 2.5 minutes at a throughput of about 750 liters per hour. In this time, the first phase of the reaction was completed.

In the highly exothermic hydrolysis which followed in part E of the reaction space (i.e., of the intermediately formed isocyanate with caustic soda to yield anthranilic acid), the temperature rose to approximately 70° C. Pursuant to the size of the reaction space employed, the residence time in this portion of the apparatus amounted to 7–8 minutes. The resulting anthranilic acid sodium salt was recovered as a pale yellow solution with a content of 12.5 percent anthranilic acid, corresponding to a yield of 95 percent of the theoretical.

What is claimed is:

1. Process for the production of anthranilic acid from phthalamic acid alkali metal salt by oxidation with alkali metal hypochlorite, that comprises continuously introducing aqueous solutions of said phthalamic acid alkali metal salt and said alkali metal hypochlorite separately in pre-determined substantially stoichiometric quantities through a suitable mixing system into a reaction column, said reaction column consisting of an initial stage including a cooling system for effecting a first-phase reaction for the production of the corresponding isocyanate, having a second stage for effecting the exothermic hydrolysis of said isocyanate to the desired alkali metal anthranilic acid salt and carbon dioxide, the reaction temperature at the output end of the second stage of said reaction column being controlled to a value not in excess of 70° C., and continuously withdrawing a solution of alkali metal carbonate and the desired anthranilic acid alkali metal salt from said second stage.

2. The process as claimed in claim 1, that further comprises neutralizing said solution of alkali metal carbonate and anthranilic acid alkali metal salt with sulphuric acid.

3. The process as claimed in claim 1, that further comprises utilizing said solution of alkali metal carbonate and anthranilic acid alkali metal salt directly within further syntheses.

References Cited

FOREIGN PATENTS 46,438  10/1962  Poland.

LEON ZITVER, *Primary Examiner.*

DANIEL D. HORWITZ, *Examiner.*